Figure 1:
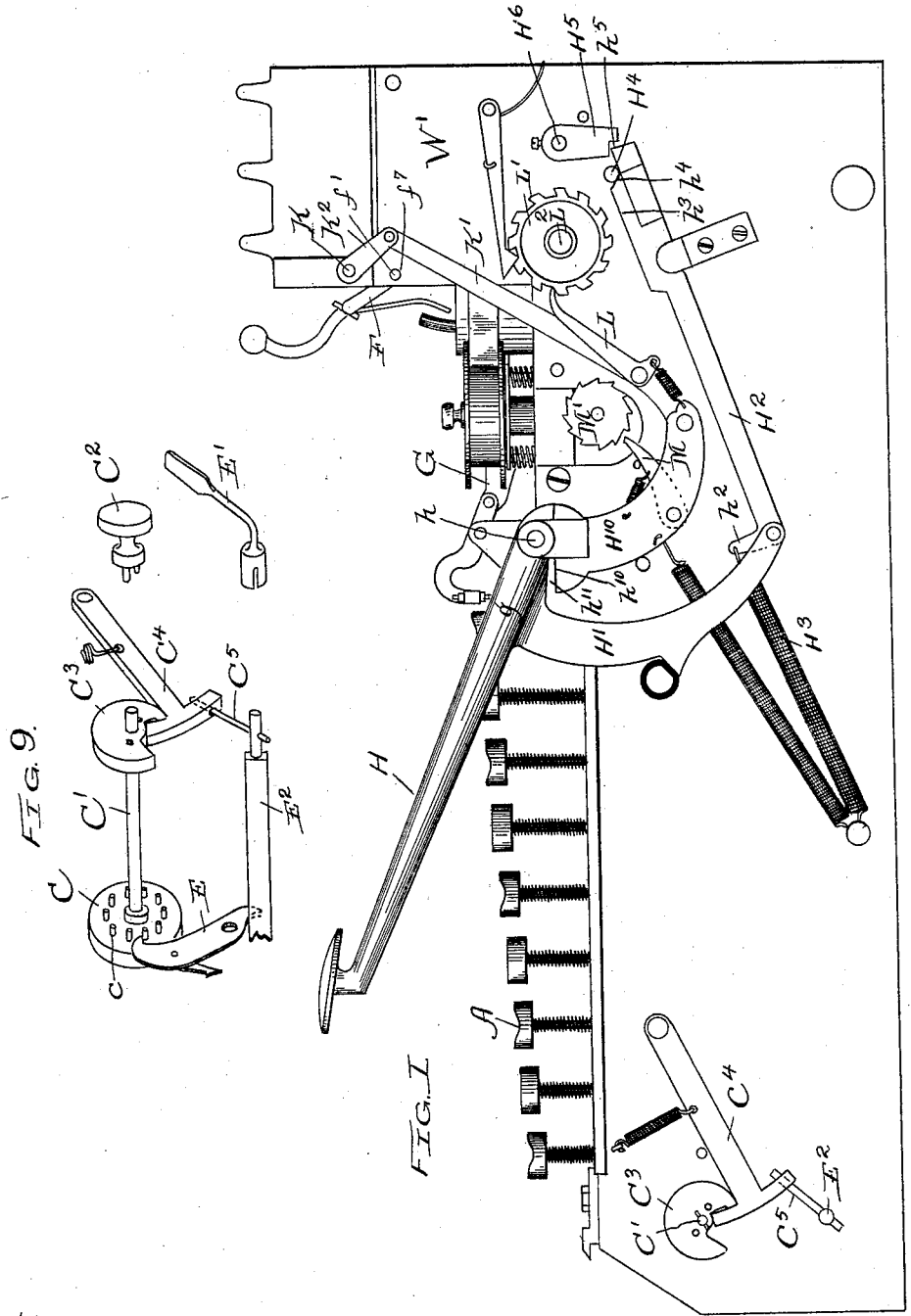

(No Model.) 7 Sheets—Sheet 1.

D. E. FELT.
COMPUTING MACHINE.

No. 568,020. Patented Sept. 22, 1896.

WITNESSES:
Sew. E. Curto
H. W. Munday,

INVENTOR:
Dorr E. Felt
By Munday, Evarts & Adcock.
HIS ATTORNEYS (No Model.) 7 Sheets—Sheet 3.

D. E. FELT.
COMPUTING MACHINE.

No. 568,020. Patented Sept. 22, 1896.

WITNESSES:
Geo. E. Curtis
H. W. Munday

INVENTOR:
Dorr E. Felt
By Munday, Evarts & Adcock
HIS ATTORNEYS (No Model.)  
7 Sheets—Sheet 4.

D. E. FELT.
COMPUTING MACHINE.

No. 568,020. Patented Sept. 22, 1896.

WITNESSES:
Sew. E. Curtis
A. W. Munday

INVENTOR:
DORR E. FELT.
BY Munday, Evarts & Adcock.
HIS ATTORNEYS.

(No Model.)
D. E. FELT.
COMPUTING MACHINE.
No. 568,020.
7 Sheets—Sheet 5.
Patented Sept. 22, 1896.
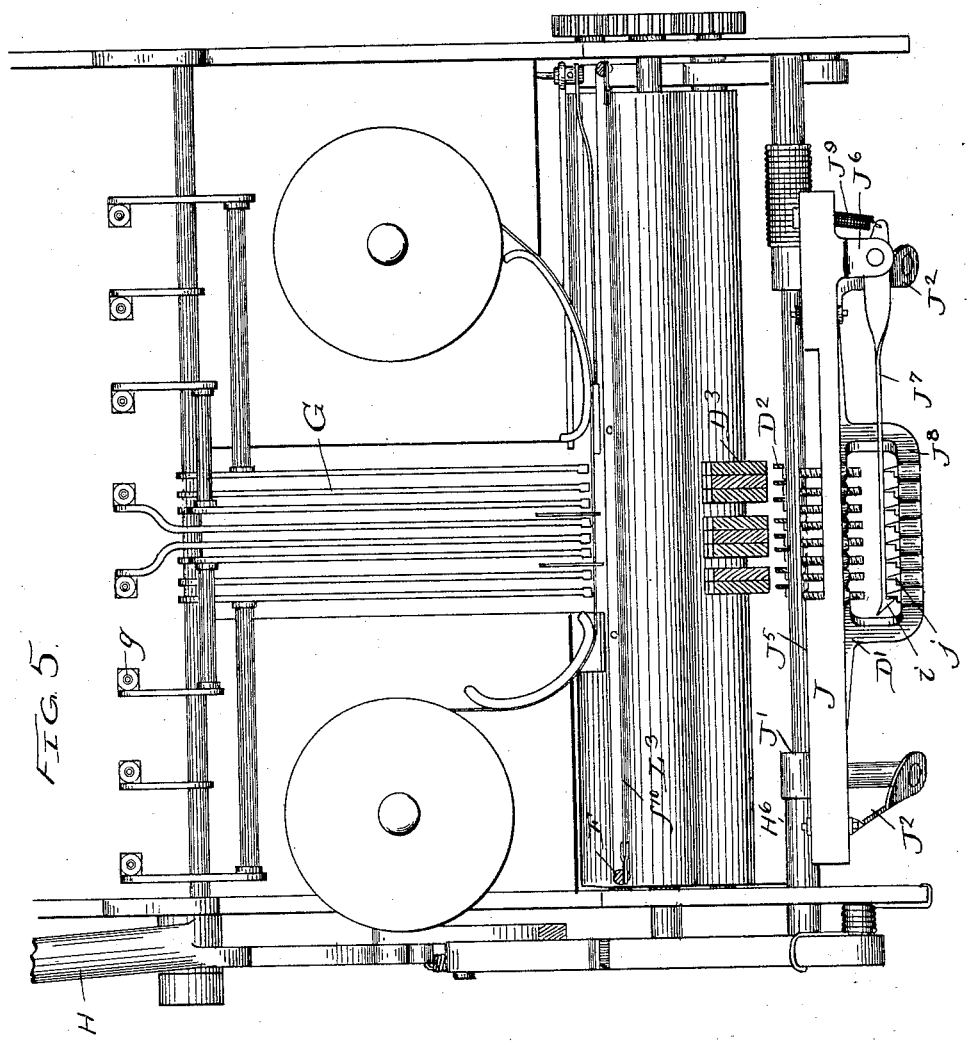
WITNESSES:
Sew. E. Curtis
A. W. Munday
INVENTOR:
Dorr E. Felt
By Munday, Evarts & Adcock
HIS ATTORNEYS (No Model.) 7 Sheets—Sheet 6.
D. E. FELT.
COMPUTING MACHINE.
No. 568,020. Patented Sept. 22, 1896.
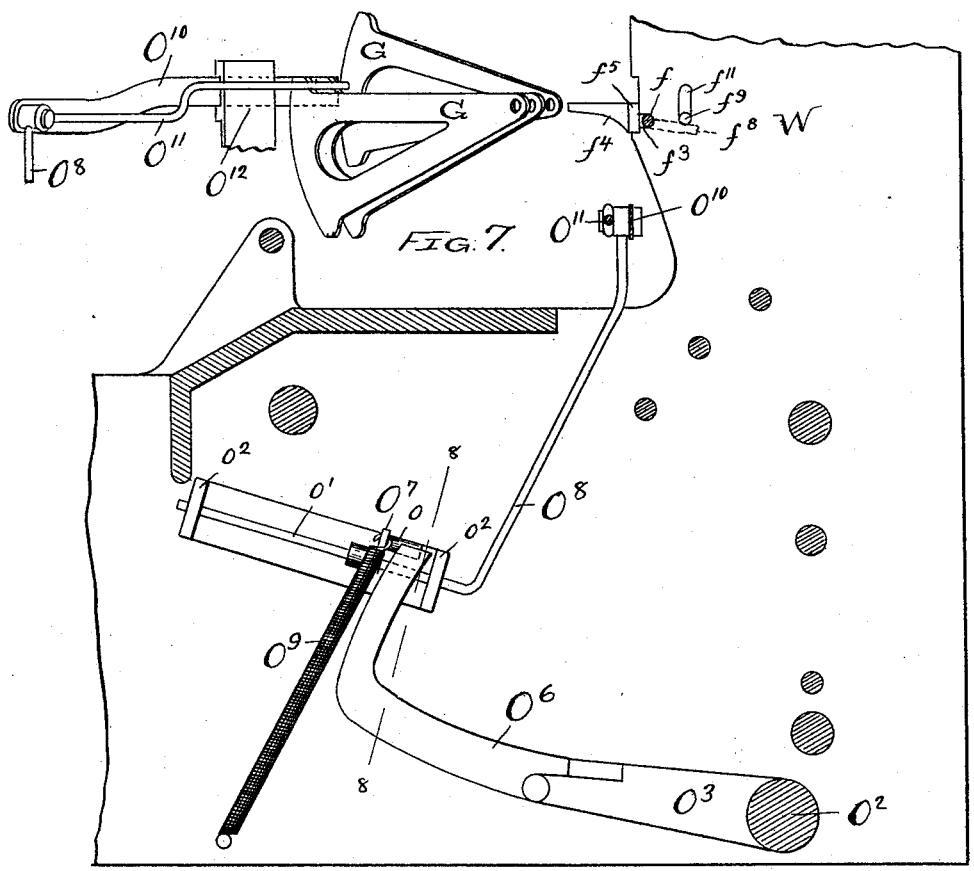
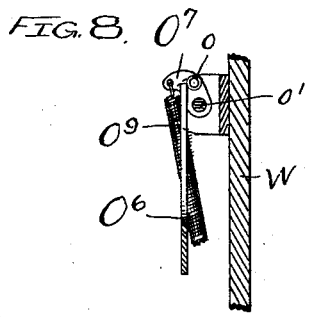
WITNESSES:
Geo. E. Curtis
A. W. Munday.
INVENTOR
DORR E. FELT
By Munday, Evarts & Adcock.
HIS ATTORNEYS.

(No Model.)
7 Sheets—Sheet 7.
D. E. FELT.
COMPUTING MACHINE.
No. 568,020.
Patented Sept. 22, 1896.
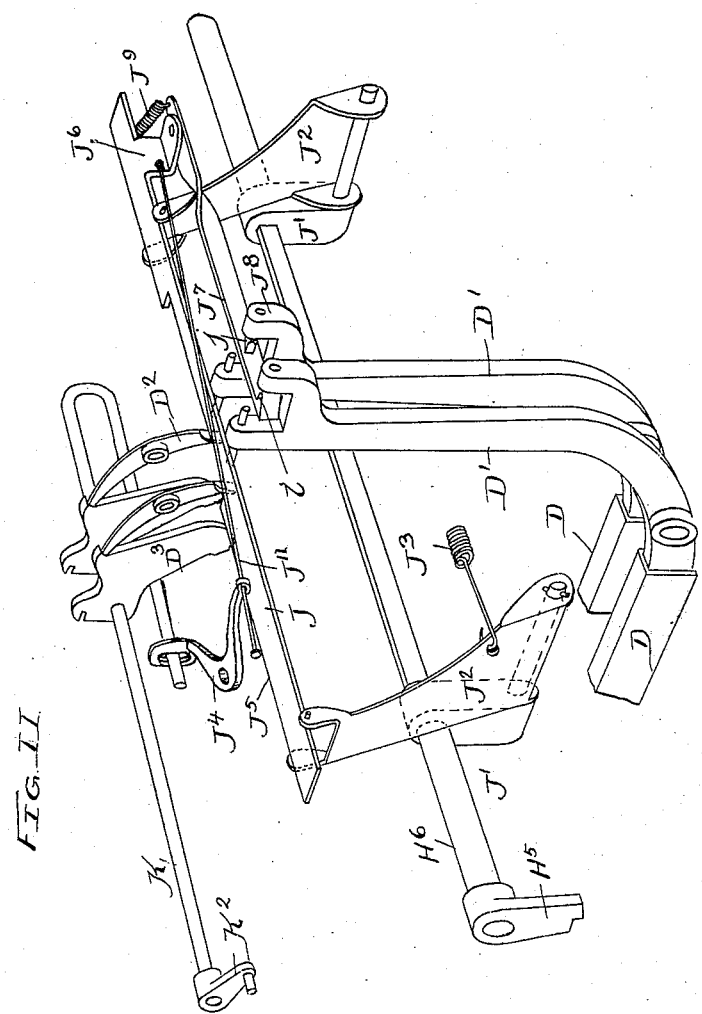
FIG. II.
WITNESSES:
Lew. C. Curtis
S. W. Munday,
INVENTOR:
DORR E. FELT
BY Munday, Evarts & Adcock
HIS ATTORNEYS.

UNITED STATES PATENT OFFICE.

DORR E. FELT, OF CHICAGO, ILLINOIS.

COMPUTING-MACHINE.

SPECIFICATION forming part of Letters Patent No. 568,020, dated September 22, 1896.

Application filed September 10, 1894. Serial No. 522,572. (No model.)

*To all whom it may concern:*

Be it known that I, DORR E. FELT, a citizen of the United States, residing in Chicago, in the county of Cook and State of Illinois, have invented a new and useful Improvement in Computing-Machines, of which the following is a specification.

This invention is an improvement in the class of arithmetical machines set forth in Letters Patent No. 465,255, granted to me December 15, 1891, and which are adapted both to perform arithmetical computations and to record the sums or amounts involved in the computation, as well as the answer or result of the computation.

Some features of the invention are useful in machines which do not record the amounts or answers.

In these machines as heretofore built by me when the operator desires to set all the numeral-wheels at zero he depresses a thumb-lever, through which he throws the locking-pawls out of engagement with the wheels, and then without releasing his control of the thumb-lever turns the shaft upon which the wheels are mounted until all of them have been carried to the desired position. In practice, however, it frequently occurs that operators, through carelessness or forgetfulness, release the thumb-lever before all the wheels have reached the proper point and thus allow one or more of the locking-pawls to engage the pins upon their numeral-wheels at too early a stage in the operation. This frequently causes breakage either of the pins or some other part of the mechanism, and to obviate such breakages, which in a machine of this class are a serious matter, I have provided the numeral-wheel shaft with a cam and connected said cam with the thumb-lever by a pivoted lever adapted when actuated by the cam to retain the thumb-lever in its depressed position automatically until the conclusion of the setting operation, so that it is rendered a matter of no moment whether the operator retains his pressure upon the thumb-lever or not; and one branch of my invention consists in the combination, with the thumb-lever, of means whereby it is thus automatically held in its acting position until all the wheels are set. The use of these automatic holding devices not only removes a frequent source of breakage and damage, but also eases the setting operation by relieving the operator of a portion of the labor heretofore entailed upon him. In my said patent I have shown a paper guiding and holding device consisting of a rocking frame, (designated as 137 in the patent.) This frame as located in the patented machine prevents access to the type-heads, so that the latter are cleaned with difficulty. In my present invention I use a similar rocking frame; but instead of making it permanent in its bearings I now make it readily removable therefrom, whereby I am permitted, whenever it becomes necessary to clean the type, to first remove the frame and gain all needed access to them. This removability of the frame is obtained by making one side of one of the bearings in which the frame is journaled removable, so as to open the bearing and permit the journal of the frame to be lifted out of it, which being done the other journal of the frame becomes easily removable from its bearing by an endwise movement.

Another of the main features of the invention consists in the combination, with the recording mechanism, of means for filling in any zero or zeros occurring in the numbers printed, that is to say, the ciphers included in the numbers and lying to the right of the highest figure printed. These means consist of an escapement device controlling the printing-hammers of the several columns, and mechanism for variably positioning said escapement device in accordance with the denomination of the highest figure or digit in the printed sum or number, so that after printing all the digits included in the number or sum said device may be made to release all the unreleased hammers lying to the right of the highest figure printed, and said hammers be thus allowed to print the ciphers in their respective columns.

Still another feature of my invention is found in the means taken to insure a proper timing of the operation of tripping the hammers for the printing of the ciphers with reference to the resetting of the hammers and the movements of the paper and ink-ribbon. All these operations are brought about by the stroke of a single hand-lever, and in order to give time for the printing of the ciphers before the other operations mentioned I provide for lost motion in the operation of the resetting and paper and ribbon mechanisms by making the hand-lever to actuate the tripping mechanism and by actuating the resetting, paper, and ribbon mechanisms by means of a second lever receiving power from the hand-lever during the latter portion of the stroke of that lever.

A further feature of the invention lies in the provision of means for preventing the printing of any characters in columns to the left of the highest figure when printing totals or results.

All these and other features of my invention are fully disclosed by me in the description given below, and illustrated in the accompanying drawings, in which—

Figure 2:
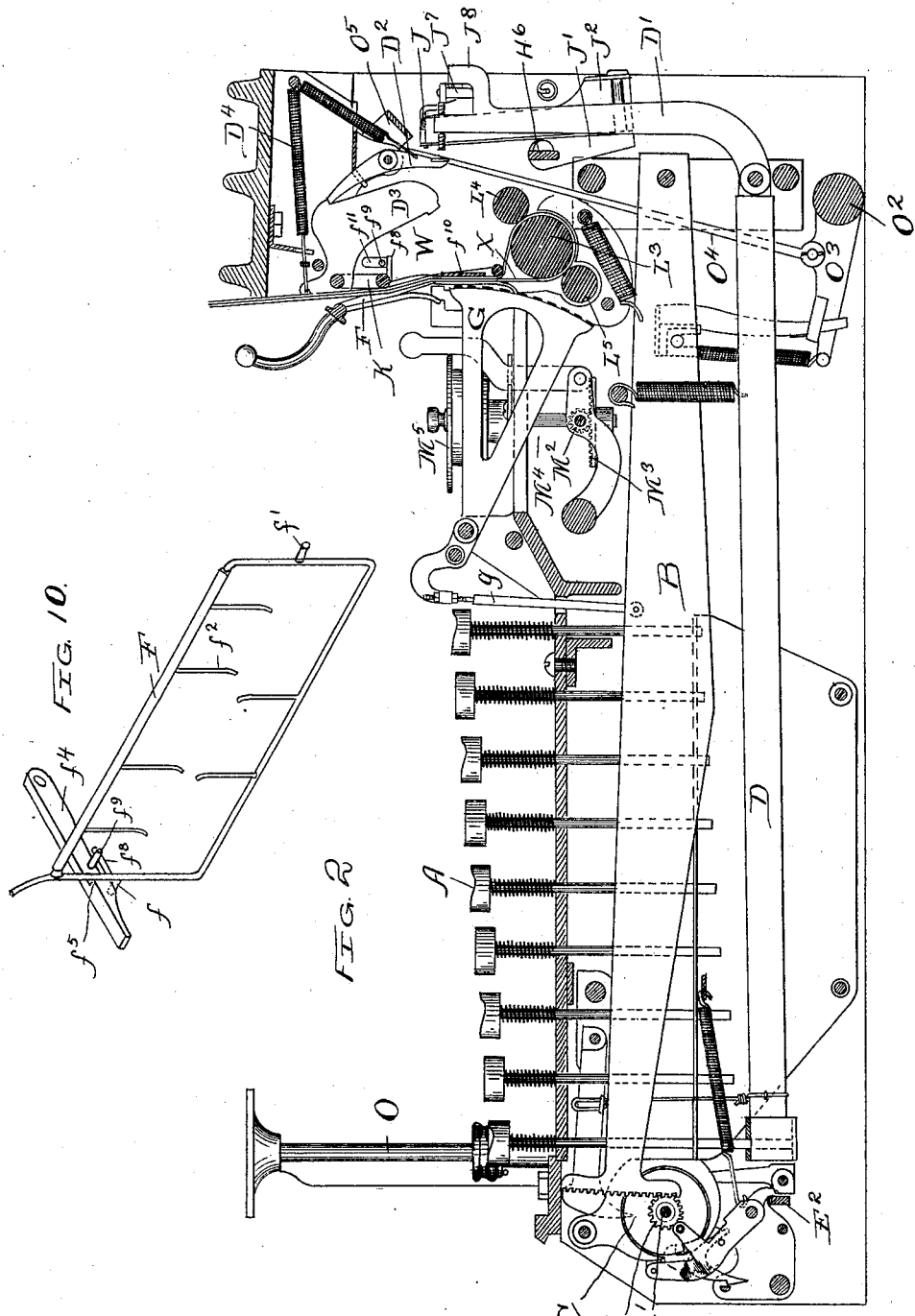
Figure 3:
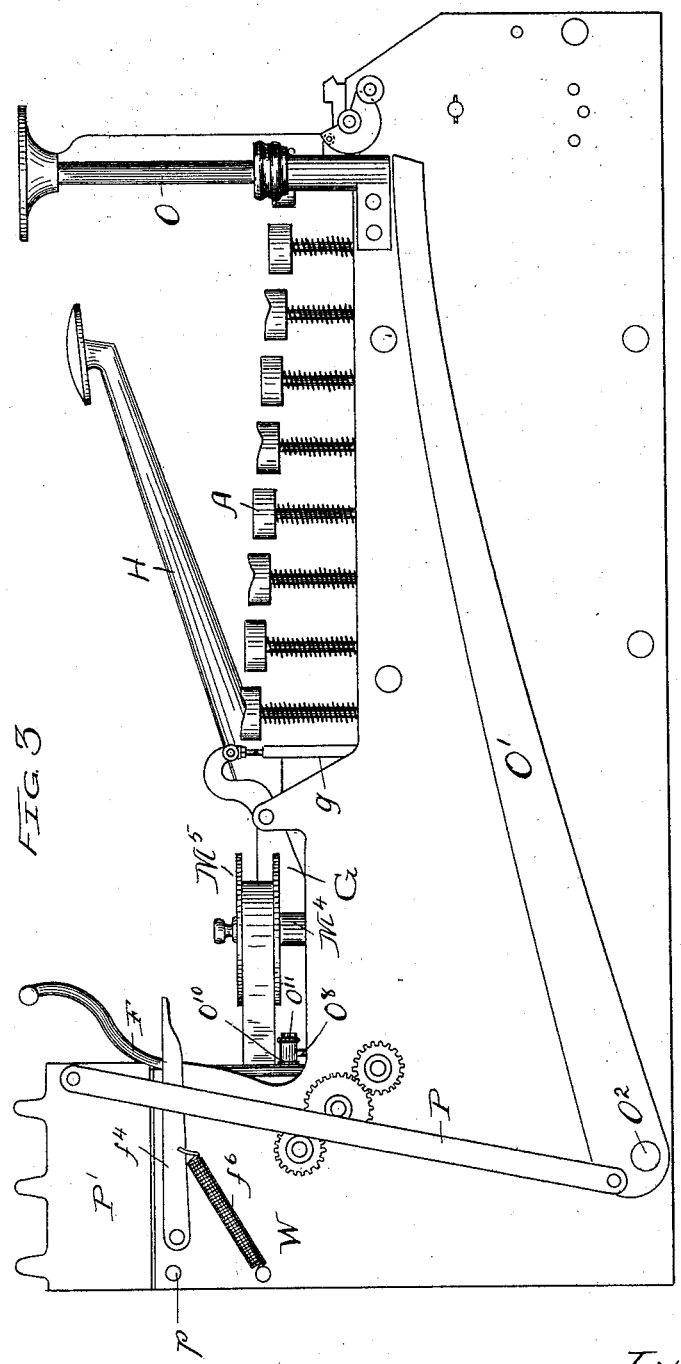
Figure 4:
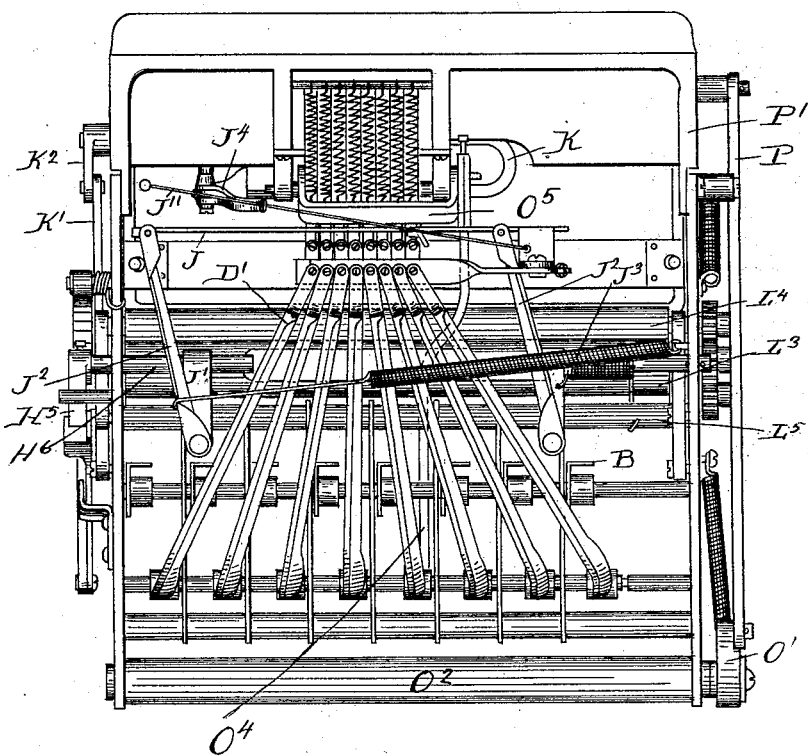

Figure 1 is a side elevation of a machine embodying my present improvements, the usual outer case being omitted. Fig. 2 is a longitudinal vertical section. Fig. 3 is an elevation of the side opposite that given in Fig. 1. Fig. 4 is a rear elevation. Fig. 5 is a partial plan. Fig. 6 is an enlarged detail perspective of the mechanism for preventing the types to the left of the highest figure struck from printing. Fig. 7 is a vertical section showing other portions of the same mechanism. Fig. 8 is a section on the line 8 8 of Fig. 7. Fig. 9 is a detail perspective of the mechanism for setting the numeral-wheels. Fig. 10 is a perspective of the paper-guiding frame. Fig. 11 is a perspective diagram of a portion of the machine.

In the drawings, A represents the series of keys; B, the segment-levers actuated by the keys and meshing with the pinions $b$; C C, the numeral-wheels rotated by the pinions $b$ and mounted upon the shaft C'; D, the stop-levers also actuated by the keys; E, the pawls or levers for locking the numeral-wheels by their engagement with the pins $c$; E', the thumb-lever which projects from the outside of the outer or inclosing case, and $E^2$ an angular rocking shaft actuated by the thumb-lever and serving, when rocked by the lever, to actuate the pawls in the releasing operation. The numeral-wheel shaft is operated in setting the numeral-wheels by the knob $C^2$ applied to its end outside of the inclosing case.

The mechanism which I have added for the purpose of retaining the locking-pawls from engagement with the numeral-wheels during the setting operation consists of a notched cam $C^3$ upon the numeral-wheel shaft, a spring-actuated oscillating lever $C^4$, controlled by said cam, and a crank-arm or lever $C^5$, secured to the releasing-shaft $E^2$ and acting to release lever $C^4$ from the cam, and also to hold shaft $E^2$ while said shaft retains control of the locking-pawls. The normal position of these parts is indicated at Fig. 9, and when the wheels are to be set the operator depresses the lever E' sufficiently to release lever $C^4$ from the notch of the cam (this operation also releasing the pawls from the wheels) and turns the shaft C' sufficiently to cause lever $C^4$ to bear upon the outer or concentric surface of the cam. When this has been done, the operator may release lever E', and during the remainder of the setting operation the pawls are automatically held from engaging the wheels by reason of the control exerted upon lever $C^4$ by the cam. When the shaft C' nearly completes its rotation and the wheels are nearly at zero, the lever $C^4$ enters the notch of the cam and allows the locking-pawls to resume action upon the wheels.

F is the paper-guiding frame, journaled at its ends upon journals $f f'$, so as to be capable of a rocking motion. It is rectangular in shape and provided with inwardly-projecting guiding points or fingers $f^2$, some of which project downwardly from the upper bar of the frame, and others of which project upwardly from the lower bar thereof. A portion of this frame stands in front of and in close proximity to the type heads or segments, and hence the latter are rendered difficult of access for cleaning. To obviate this, the frame is made removable, and to permit the removal one of the bearings in which the frame is journaled is provided with a removable section or side. This bearing, which is in the side plate W, is shown at $f^3$, and consists of a notch in the front edge of the plate and a swinging keeper $f^4$, having a projecting portion $f^5$, adapted to close the notch and retain the frame-journal therein, and to be lifted above the notch when the frame is to be taken out. A spring $f^6$ tends to maintain this keeper in its normal position. The bearing for the other journal of the frame is shown at $f^7$ in plate W', and no part of it needs to be removable. The frame also carries a horizontally-projecting arm $f^8$, which extends under and comes in contact with a pin $f^9$, standing out laterally from the keeper, and thereby the keeper, which is constantly drawn downward by its spring, tends to maintain the frame with its lower half in its forward position, so that the rubber strip $f^{10}$, which is carried by the frame and which receives the impact of the printing-hammers, is kept closely pressed against the paper in the plane at which the printing is done, as clearly shown at Fig. 2. The pin $f^9$ works in a slot $f^{11}$ in the side plate W.

I will now describe the improvements made in the recording mechanism whereby the ciphers occurring in the printed numbers may be filled in.

Each segment-lever B is connected to the front end of a pivoted type segment or head G by an adjustable connecting-rod $g$, so that whenever any key is struck the segment-lever corresponding to the series of keys to which the one struck belongs depresses the front end of the type-head corresponding to the lever and lifts the type-bearing end of the head to a point where it presents the type-figure corresponding to the key struck. In striking the key the stop-lever D is also actuated, and through the medium of the right-angled extension D' of lever D, which strikes the lower end of the pivoted trip $D^2$, the hammer $D^3$ is released from the trip and allowed to swing under the power of its spring $D^4$, thereby forcing its lower end against the rubber strip $f^{10}$ and making the impression upon the paper X. This operation is of course repeated with each key which may be struck in other columns, the hammers which are operated therein remaining lowered until they are raised by mechanism which will be described later on. In their normal positions the type-heads present the type of a zero at the printing-point, and consequently do not need to change their position in the printing of the ciphers. After all the digits in the number being printed have been thus impressed upon the paper, I proceed to fill in any ciphers which may be necessary to complete the printing by mechanism which I will now describe. At the side of the machine is a hand-lever H, somewhat similar to the one shown in my said patented machine, and which may be conveniently termed the "spacing-lever," as it actuates the line-spacing of the paper. This lever is pivoted at $h$, and is provided with a downward arm H', to which is pivotally joined a bar $H^2$, one end of which carries an upstanding arm $h^2$, to which arm a spring $H^3$ is joined. The other end of the bar has a raised surface $h^3$ and a bevel or incline $h^4$, and the action of the spring $H^3$ tends to keep either the bevel or the raised surface against the cam $H^4$, according to the position to which the bar may be carried by the hand-lever. The extremity $h^5$ when the bar is moved forward by the depressing of the lever engages the lower end of a crank-arm $H^5$, carried upon the end of a rock-shaft $H^6$, and imparts a slight movement to said shaft. This engagement of the bar and crank-arm is, however, only momentary, because the bar is depressed as it moves forward by the cam $H^4$, and soon frees itself from the crank-arm, and in the subsequent portion of its stroke is kept from reëngagement by the contact of its raised portion $h^3$ with cam $H^4$. The rocking of shaft $H^6$ swings the escapement device, and through it trips the hammers of the columns in which the ciphers are to be printed, and thus causes them to print. This escapement device consists of a bar J, placed transversely of the machine and having both a longitudinal and a front and back motion, and having a notched or cut-away portion on the side toward the hammers. To permit the first of these motions, the bar is supported from shaft $H^6$ by arms J' and $J^2$, the former fast upon the shaft and the latter pivoted both to the arms J' and to the bar, and the actuating power in said movement is furnished in one direction by the spring $J^3$, attached to one of the arms $J^2$, and in the other direction by the lever $J^4$, more fully described hereinafter.

The forward-and-back motion is due to the rocking of shaft $H^6$. The bar is positioned by the longitudinal movement so that its acting edge $J^5$ will, when the bar is moved forward by the rocking of the supporting-shaft, come against the lower ends of the trips $D^2$ lying to the right of the highest figure impressed by the striking of the keys and release all of them not previously released by the keys, so that the hammers of such trips are made free to act and impress the ciphers which may be lacking to complete the printing. In this operation the trips to the left of the highest figure are not operated because by the longitudinal positioning of the bar its notched portion is brought opposite those trips and contact with them is thereby avoided.

The regulating of the variable-positioning movements of the bar is accomplished as follows: Pivoted to a rearwardly-projecting ear $J^6$ upon the bar is an escapement-lever $J^7$, lying parallel to the bar and having a hook $i$ at its end. This hook is adapted to engage severally with the series of movable points $j$, which are positioned in a row at the side of the escapement-lever. There is one of these points for each column of figures embraced in the machine, except the highest, and each of them is supported from one of the extensions D' by means of bent arms $J^8$, provided upon said extensions. The points move toward the escapement-lever with each actuation of their supports, and if the hook of the lever is at the time of any actuation in engagement with any point to the right of the particular point which is actuated then the lever is thereby forced out of such engagement and immediately the spring $J^3$ acts to carry the notched bar to the left. Such movement is, however, arrested when the hook of the escapement-lever reaches the point $j$ last actuated and by which the escapement-lever was freed from the point previously engaged. To insure these engagements by the hook with the points $j$, a laterally-acting spring $J^9$ is attached to the escapement-lever, so that its hooked end is kept closely up against the points $j$.

With this construction of the escapement the operation is as follows: When the operator strikes a key in the lowest column, no action of the escapement results because the engagement of the hook $i$ with the point $j$ of that column is not thereby broken; but if the operator strikes a key in the second column the point $j$ carried by the stop-lever extension of that column is forced toward the escapement and carries it out of engagement with the first point $j$, so that the notched bar and escapement are free to yield to spring $J^3$ and move longitudinally until the hook $i$ catches the point $j$ of said second column. In the same manner, if the operator strikes keys in any of the columns to the left of the one whereat the escapement may be at the time, a movement of the escapement to the left will result, which will be arrested when the point $j$ of the highest column struck is reached by the hook $i$, whether such column is next in order or not. So if the highest column is struck first the escapement moves at once to that column and the striking of lower figure keys subsequently is without effect upon it, because its hook is already positioned to the left of the columns in which those keys are located. It will thus be seen that the escapement device is positioned longitudinally by the striking of the keys in impressing the digits embraced in the number or sum being printed, and that such position is governed by the denomination of the highest key struck, and that when thus positioned a stroke of the spacing-lever will cause the printing of the ciphers in the vacant spaces left to the right of the highest figure impressed by the keys, the notched bar of the escapement device being now positioned to release the hammers of the columns in which the ciphers are located when it is actuated by the rocking of shaft $H^6$ under the impulse received by the spacing-lever.

After the ciphers have been printed as set forth, the escapement device is returned to its normal position by the pivoted lever $J^4$, which is actuated by the device whereby the hammers are reset, as hereinafter explained, said lever being connected to the notched bar by the rod $J^{11}$, as plainly illustrated, particularly at Fig. 11. In the return movement the escapement-lever automatically engages again with the point $j$ of the first or lowest column, and this part of the mechanism is then ready for the printing of another sum.

The spacing-lever not only causes the printing of the ciphers, but it also actuates several other mechanisms—viz., the mechanism for resetting the hammers, the paper-spacing mechanism, and the ribbon-moving mechanism—and in order to give time for the printing before these mechanisms are set in operation I make provision for lost motion by making the arm $H^{10}$, through which the spacing-lever gives motion to said mechanisms, in a separate piece from the lever, hinging it upon the pivot $h$, and providing both it and the lever with broad contact-surfaces $h^{10}$ in the rear of the pivot and normally with a vacant space $h^{11}$ between them. With this construction the arm $H^{10}$ is actuated by the contact of the surfaces $h^{10}$, but the lever H is permitted to move far enough to insure the printing before such contact takes place, thus giving the printing precedence in point of time over the other operations. The arm $H^{10}$ is joined to the swinging frame K, whereby the tripped hammers are lifted to their normal positions (shown at Fig. 2) at the conclusion of the printing of the sum or number by the connecting-bar $K'$ and the crank-arm $K^2$ upon the frame K. The connecting-bar $K'$ also carries a pawl L, which engages a ratchet-wheel $L'$ upon the journal $L^2$ of the paper-roller $L^3$ and actuates said roller in spacing the paper for the lines. Companion rollers $L^4$ and $L^5$ hold the paper closely to roller $L^3$ and compel it to move with the latter. The moving of the inking-ribbon is due to the engagement of the pawl M, borne by arm $H^{10}$, with the ratchet $M'$, the shaft of which carries a pinion $M^2$, meshing with a side-faced gear $M^3$ upon the vertical shaft $M^4$ of the ribbon-spool $M^5$.

In printing results or totals all the hammers are tripped and the type-heads are moved so they will present type to the hammers corresponding to the figures indicated by the numeral-wheels. In these operations the actuating power is obtained by depressing a plunger O, which actuates the lever $O'$ and through it rocks the shaft $O^2$. A crank-arm $O^3$ is carried by the shaft, and from such arm a connecting-rod $O^4$ extends up and is joined to a frame $O^5$, which extends across the series of trips $D^2$ and is pivoted so it may rock when actuated by the rod $O^4$. In its rocking movement this frame releases all the hammers, as stated, but inasmuch as the result will often include only a portion of the columns embraced in the machine I provide the following means for preventing any printing in the columns not needed in giving expression to the result: Attached to shaft $O^2$ is a bent lever or arm $O^6$, the upper end of which bears against a roller $o$, carried upon a crank $O^7$, borne upon the pivotal portion $o'$ of a rocking lever $O^8$. The pivotal portion of the lever is supported in bearings $o^2$, attached to the side plate W. A spring $O^9$ is attached to the end of the crank and draws it downward, and the tendency thus imparted is resisted and controlled by the bent lever $O^6$, the depressing of the lever $O^6$ permitting the rocking lever to move in obedience to the spring. Projecting horizontally from the upper end of the rocking lever $O^8$ is a flat metal arm $O^{10}$ and a wire arm $O^{11}$, the former sliding through the guide $O^{12}$ and acting as a shield and the other arm acting as a stop. When the rocking lever $O^8$ is permitted to rock in obedience to the spring, the arm $O^{11}$ is moved from the left over such of the type-heads as are not raised preparatory to printing the result, and this movement continues until the stop comes against and is arrested by the first one of the type-heads which has been raised. This clearly appears in Fig. 6, and when thus arrested of course the rocking of lever $O^8$ ceases. In the same movement the shield $O^{10}$ is carried into position in front of the type-heads at the left which have not been raised, and between such heads and their hammers, and prevents any impressions being made by them. The positioning of the shield is determined by the stop and is in accordance with the number of columns at the left of the machine which are not embraced in the result being printed. I do not set forth in this application the manner in which the type-heads are positioned in printing the answers, as my invention does not concern that operation, and, moreover, my said patent fully discloses the same.

A lever P is pivotally joined to the lower end of lever O' eccentrically of the latter's shaft and to the upper portion P' of the frame, said upper portion carrying the hammers and being pivoted at $p$, so as to permit said lever to lift it slightly when the answer-printing mechanism is operated. The purpose of this is to bring the hammer and type into proper alinement at the time of printing.

The type heads or segments require very minute and careful adjustment, so they will print all their characters in proper alinement, and I find that it is frequently very difficult to obtain this adjustment wholly through the link or rod $g$, and hence I make the ends of the segment to which the rods are attached in bent or gooseneck form, as plainly illustrated. This enables me to bend these portions of the segments so as to carry the points at which the rods $g$ are attached either to front or back, as occasion requires, thereby in effect either lengthening or shortening the lever end of the segments.

I claim—

1. The combination with the rocking paper-frame having an arm $f^8$, of the swinging keeper having a pin $f^9$, and the spring acting downwardly upon the keeper, substantially as specified.

2. The combination with the printing mechanism of a computing-machine, of keys adapted to set the printing mechanism in operation for printing the digits, and means operated by hand for operating said printing mechanism in printing the zeros to the right of the highest digit printed, substantially as specified.

3. In a machine for making and recording computations, having a printing mechanism and keys controlling the same in the printing of the digits, the combination with said mechanism of means for controlling the same in the printing of the zeros, and a hand device for setting said means in operation, substantially as specified.

4. In a machine for making and recording computations, the combination with the printing mechanism of keys for controlling said mechanism in the printing of the digits, and a hand device independent of the keys for controlling said mechanism in the printing of the zeros, substantially as specified.

5. In a machine for making and recording computations, the printing mechanism in combination with the keys adapted to control said mechanism in printing the digits, and a hand device independent of the keys adapted to control said mechanism in printing the zeros, and means for preventing the printing of any zeros to the left of the highest digit printed, substantially as specified.

6. The combination with the printing mechanism of a computing and recording machine, of a device for releasing the hammers of the columns in which ciphers are to be printed, and means for variably positioning said device in accordance with the highest figure struck by the keys, substantially as set forth.

7. The combination with the printing mechanism of a computing and recording machine, of an escapement device moving transversely of the series of hammers and serving to release the hammers of the columns in which ciphers are to be printed, and means for variably positioning said device in accordance with the highest figure struck by the keys, substantially as set forth.

8. The machine for making and recording computations, the combination with the printing mechanism of keys adapted to set said mechanism in operation for printing the digits, and a hand device independent of the keys for setting said mechanism in operation in printing the zeros to the right of the highest digit printed by the keys, substantially as specified.

9. The combination with the hammers of the printing mechanism, and their controlling-trips, of the notched bar for releasing the trips, means for positioning said bar and means for actuating it in the releasing operation, substantially as set forth.

10. The combination with the hammers and their trips, of the notched bar having both a longitudinal movement, and a front and back movement, the escapement-lever regulating the longitudinal movement, the series of points controlling the lever, the keys, and connections between said points and the keys whereby the latter operate the points, substantially as set forth.

11. The combination in a computing and recording machine with the mechanism for printing the zeros, and a frame K for resetting the hammers after printing, of devices for actuating both said printing mechanism in the printing operation and said frame in the resetting operation, and adapted to actuate the printing mechanism in advance of the resetting, substantially as specified.

12. The combination with the printing mechanism and the mechanism for actuating said printing mechanism in printing the answers, of devices for interposing a shield between the hammers and the type of the columns above the highest figure in the answer, substantially as set forth.

13. The combination with the printing mechanism and the mechanism for setting it in operation to print the answers, of a shield adapted when interposed between the type and the impressing device to prevent the impression, and means for thus positioning said shield so as to prevent impressions above the highest column in the answer, substantially as set forth.

14. The combination with the shield and means for moving it into position between the type and the impressing device, of the stop moving with the shield and adapted to be arrested by the type-heads, substantially as set forth.

15. The combination with the shield and means for moving it into position between the type and the impressing device, of the stop for regulating the positioning of the shield, substantially as specified.

16. The combination with the hammers of the printing mechanism, of a device for tripping the hammers to print answers, means for operating said tripping device, and a movable shield adapted to be interposed between the type and paper for preventing the hammers above the highest column in the answer from printing, substantially as specified.

17. In a computing-machine, the numeral-wheels, the shaft upon which they are mounted and by which they are turned in resetting, the pawls for normally locking the wheels, a rocking shaft for releasing the locking-pawls, and a hand device whereby to rock said shaft in releasing the pawls, in combination with the cam upon the numeral-wheel shaft, the oscillating lever and the arm upon the releasing-shaft engaged by the oscillating lever, substantially as specified.

18. In a computing-machine, the numeral-wheels, the shaft upon which they are mounted and by which they are turned in resetting, the pawls for normally locking the wheels, a device for releasing all said pawls from the wheels, and a hand device for actuating said releasing device, in combination with a cam upon the numeral-wheel shaft and connections essentially as set forth between the releasing device and the cam whereby the releasing device may be controlled by the cam during the resetting, substantially as specified.

19. In a computing-machine, the numeral-wheels, the shaft upon which they are mounted and by which they are turned in resetting, the pawls for normally locking the wheels, a device for releasing all said pawls from the wheels, and a hand device for actuating said releasing device, in combination with a cam upon the numeral-wheel shaft and connections between the releasing device and the cam, whereby the cam may control the releasing device during the resetting, and a spring for returning said connections to normal position at the conclusion of the resetting, substantially as specified.

DORR E. FELT.

Witnesses:
  EDW. S. EVARTS,
  H. M. MUNDAY.